J. L. SCULL.
GASOLENE STRAINER.
APPLICATION FILED MAY 13, 1916.
1,191,741.
Patented July 18, 1916.
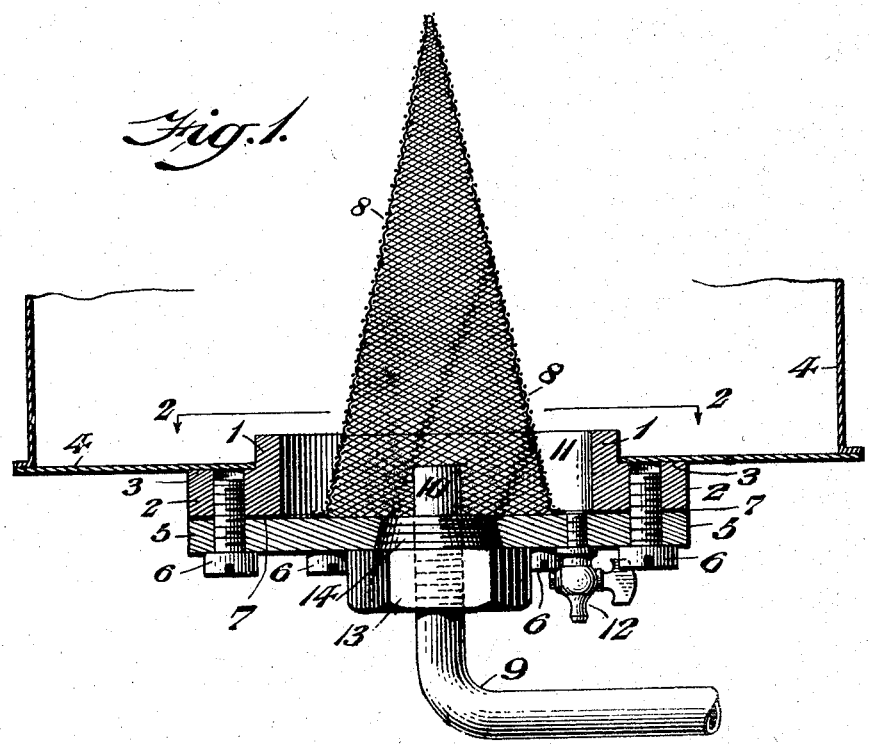
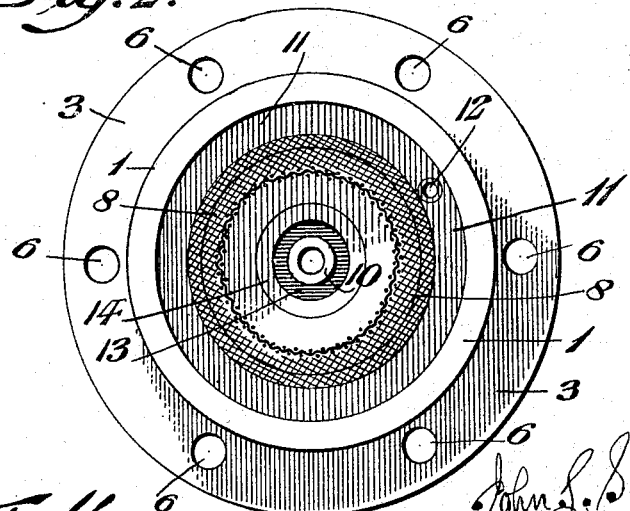
WITNESSES
INVENTOR
John L. Scull
BY
ATTORNEYS

UNITED STATES PATENT OFFICE.

JOHN L. SCULL, OF PHILADELPHIA, PENNSYLVANIA.

GASOLENE-STRAINER.

1,191,741.   Specification of Letters Patent.   Patented July 18, 1916.

Application filed May 13, 1916. Serial No. 97,279.

*To all whom it may concern:*

Be it known that I, JOHN L. SCULL, a citizen of the United States, residing in the city and county of Philadelphia, State of Pennsylvania, have invented a new and useful Gasolene-Strainer, of which the following is a specification.

My invention consists of a strainer for gasolene or like fuel which is adapted to be attached to the supply tank for the same, as a fixture thereof, the same embodying a flanged ring, a plate which is adapted to be secured to the underside of said ring and close the bottom thereof, and a strainer proper of suitable shape which is adapted to rise from said plate into the chamber formed by said ring, whereby straining of the gasolene or fuel may be effectively accomplished, and sediment or foreign matters in the gasolene or fuel may be trapped in said ring and said strainer proper, provision being made for removing the same, as will be hereinafter set forth.

The invention is satisfactorily illustrated in the accompanying drawing, but the important instrumentalities thereof may be varied, as long as they are included in the scope of the claims.

Figure 1 represents a vertical section of a strainer embodying my invention. Fig. 2 represents a horizontal section on line 2—2 Fig. 1.

Similar numerals of reference indicate corresponding parts in the figures.

Referring to the drawings, 1 designates a ring having on the outer side thereof the laterally projecting flange 2, whose upper face 3 is below the top of the ring, forming a base on which is supported the gasolene or fluid containing tank 4, the bottom of which latter has therethrough an opening the wall of which surrounds the exterior of the upper portion of the ring 1 and is tightly secured thereto, the portion of said bottom of the tank around said opening being rested on said face and soldered, brazed or otherwise firmly secured thereto.

The ring 1 is closed by the plate 5 whose peripheral portion extends under said ring and the flange 2 and is secured thereto by the bolts or screws 6 which pass through said plate into said flange, packing 7 being interposed between the plate and ring and flange to form a tight joint therefor. Rising from the plate 5 is the strainer proper 8 comprising a hollow body formed of suitable gauze or other suitable reticulated material, said strainer proper projecting upwardly into the tank 4, and being in the present case of conical form to which, however, I do not limit myself. To the plate 5 at the center thereof is secured the outlet or discharge pipe 9, the top portion 10 of which is extended above said plate, so as to extend partly into the strainer proper, above the bottom thereof.

The lower portion of the strainer proper is set in from the inner periphery of the ring 1, so as to leave between them the chamber 11. It will be seen that the gasolene supplied to the tank 4 flows through the gauze surface of the strainer into the body of the latter, and so as is evident, is effectively strained, since the entire length of the strainer proper is presented for that purpose. The strained gasolene then enters the outlet pipe 9 at the top 10 thereof, it being evident that the plate 5 closes the bottom of the body of the strainer proper, so that the strained gasolene or fluid is directed to the top after which it is directed elsewhere by the pipe 9 as desired.

Should there be sediment in the gasolene, it may collect and be deposited in the chamber 11, from whence it may be removed through the bottom plate 5 by means of the cock 12 which is connected with the plate 5. Should any sediment pass into the strainer it may collect and be deposited in the base thereof on the plate 5, below the raised top 10 of the pipe 9 and so not enter the latter. Said pipe 9 being secured in part to the plate 5 by means of the nut 13, the same having the upper portion of said pipe screwed thereto, it having also a conical neck 14 which is adapted to be screwed to the wall of an opening centrally in said plate forming a tight joint therewith. Said nut may be unscrewed from the plate, and said plate displaced, when the sediment in the body of the strainer proper may be discharged. It will be noticed also that as portion of the ring projects above the upper face 3 of the flange 2, the bottom of the tank is below the top of the ring, so that should there be condensation of water in the tank, the drops thereof will sink and settle on said bottom, and the upwardly projecting portion of the ring will act as a wall to prevent the water from entering the chamber formed by the ring and reaching the strainer.

Having thus described my invention what

I claim as new and desire to secure by Letters Patent, is:—

1. In a strainer of the character stated, a strainer proper, a ring, a plate on the latter forming the bottom thereof, said strainer proper rising from said plate within said ring, a discharge pipe in said plate adapted to enter said strainer proper, said ring having on its side an outturned flange on which a supply tank is seated and to which its bottom is secured around said ring.

2. In a strainer of the character stated, a ring forming a chamber, the same having on its side an outturned flange on which a supply tank is seated and to which its bottom is secured around said ring, a plate adapted to close the base of said ring, means on said plate for connecting the latter with said flange, a strainer proper in said ring rising from said plate, and a discharge pipe connected with said plate having its upper end adapted to enter said strainer proper from below.

3. In a strainer of the character stated, a ring forming a chamber, the same having on its side an outturned flange on which a supply tank is seated and to which its bottom is secured around said ring, a plate adapted to close the base of said ring, means on said plate for connecting the latter with said flange, a strainer proper in said ring rising from said plate, a discharge pipe connected with said plate having its upper end adapted to enter said strainer proper from below, and a fitting adapted to engage said discharge pipe and connect it with said plate.

4. In a strainer of the character stated, a ring forming a chamber, the bottom of which is closed, a strainer rising from said bottom, an outturned flange on the exterior of said ring, the same having its upper face below that of the upper face of said ring, and a tank which is adapted to be supported on said flange around said ring, whereby the bottom of said tank is below the upper face of said ring.

5. In a strainer of the character stated, a ring forming a chamber, the bottom of which is closed, a strainer rising from said bottom, an outturned flange on the exterior of said ring, the same having its upper face below that of the upper face of said ring, a tank which is adapted to be supported on said flange around said ring, whereby the bottom of said tank is below the upper face of said ring, and an outlet conduit on said bottom, the same being adapted to project into the strainer and having its entrance end above said bottom.

JOHN L. SCULL.

Witnesses:
 JOHN A. WIEDERSHEIM,
 N. BUSSINGER.